Nov. 17, 1942.    H. F. PARKER ET AL    2,302,049
MEASURING AND CONTROL METHOD AND APPARATUS
Original Filed Jan. 16, 1934
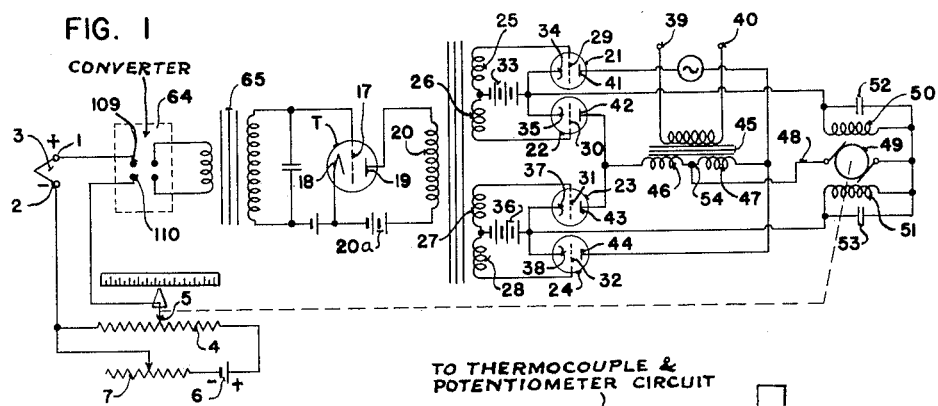
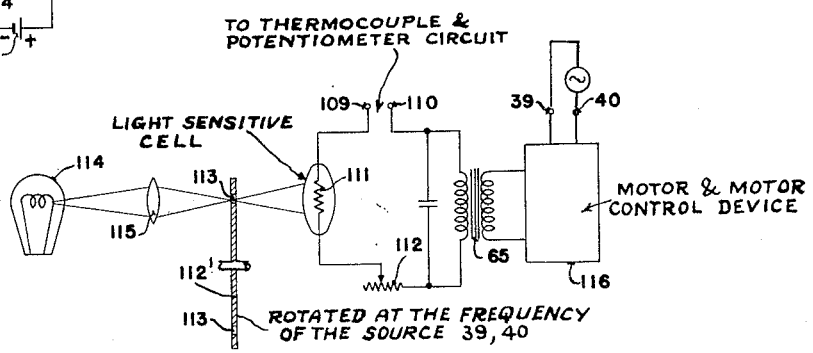
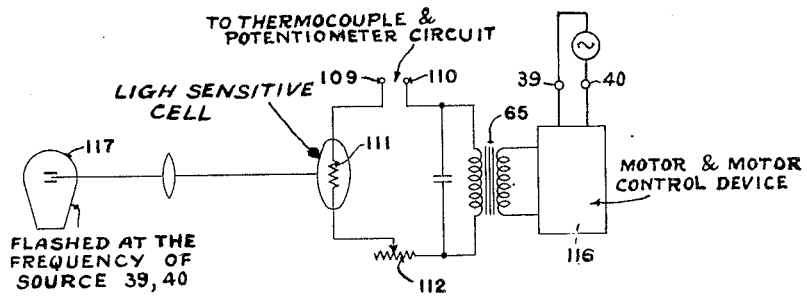
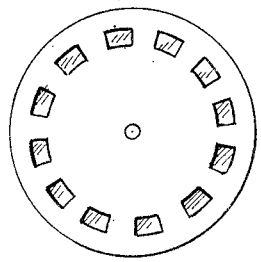
INVENTOR.
HUMPHREY F. PARKER
JULIUS G. ACEVES
BY George M. Umschaup
ATTORNEY.

Patented Nov. 17, 1942

2,302,049

UNITED STATES PATENT OFFICE 2,302,049

MEASURING AND CONTROL METHOD AND APPARATUS

Humphrey F. Parker, Kenmore, and Julius G. Aceves, New York, N. Y., assignors to Brown Instrument Company, Philadelphia, Pa., a corporation of Pennsylvania Original application January 16, 1934, Serial No. 706,832. Divided and this application October 11, 1938, Serial No. 234,376

12 Claims. (Cl. 171—95)

This invention relates to measuring and control systems, and more particularly to systems involving the measurement and/or recording of electric currents or potentials and their utilization for control purposes.

A principal object of the invention is to provide an arrangement for measuring and/or recording potential or current variations of minute magnitude.

Another object is to provide an arrangement for employing current or potential variations of minute magnitude to control the operation of electromechanical devices.

A further object is to provide an arrangement for translating minute D. C. variations into currents of comparatively large amplitude and power, without the necessity of employing a great number of amplifying stages.

A still further object of the invention is to provide a rugged and highly accurate instrument for indicating and/or recording potential or current variations for measurement or control purposes.

A feature of the invention relates to an improved instrument for indicating and/or recording and/or controlling temperature conditions.

A specific object of the present invention is to provide means for measuring and/or utilizing for control and analogous purposes, minute direct currents such as those resulting from variations of thermocouples in measuring temperatures, or from photovoltaic cells.

A still further object of the present invention is to provide novel and effective means for converting a small direct current into an alternating current which may be readily amplified for measurement and other purposes.

A further object of the invention is to effect a novel and desirable combination of means for converting direct current into alternating current and amplifying the alternating current with potentiometric measuring means to thereby produce a novel and relatively simple form of self balancing potentiometer instrument which may follow the approved practices of the art in respect to many of its features, and may be produced, for example, by the elimination or replacement of a relatively small portion only of the parts of a potentiometer instrument of desirable commercial form.

In accordance with the present invention, we utilize the source of small direct current electromotive force to create a pulsating current by connecting said source in circuit with a resistance formed by a selenium cell or other device, varying in electrical resistance with the amount of light transmitted to it, and transmit light to said device from a source of light varying in intensity with suitable regularity and frequency, and advantageously consisting of a neon glow lamp energized by alternating current of commercial frequency. The pulsating current thus created is converted by suitable apparatus such as an ordinary transformer into alternating current which may be amplified by the use of one of various known forms of amplifiers.

The various features of novelty which characterize our invention are pointed out with particularity in the claims annexed to and forming a part of this specification. For a better understanding of the invention, however, its advantages and specific objects attained with its use, reference should be had to the accompanying drawing and descriptive matter in which we have illustrated and described a preferred embodiment of the invention.

Of the drawing:

Fig. 1 is a schematic diagram showing the invention as embodied in an instrument for measuring temperature variations;

Fig. 2 is a detail view of a form of converter which may be employed in the arrangement of Fig. 1;

Fig. 3 illustrates, more or less diagrammatically, a modification of the converter shown in Fig. 2; and Fig. 4 illustrates another modification of the converter shown in Fig. 2.

Referring more particularly to Fig. 1, there is shown in schematic form an instrument of the general type disclosed in our copending application Serial No. 667,237, now Patent No. 2,150,006 issued March 7, 1939. This instrument comprises a pair of terminals 1, 2, upon which are impressed the currents or potentials of minute magnitude to be measured. As indicated in the drawing, the terminals 1 and 2 may be connected to a thermocouple 3 or other similar D. C. source of small E. M. F. Associated with the terminals 1 and 2 is a potentiometer comprising the slide wire 4 with its associated adjustable slide wire contact 5. A "primary" or "secondary" standard cell 6 is connected through the current limiting resistance 7 to the slide wire 4 in known manner.

The movable contact arm 5 of the slidewire resistance is attached to a suitable carrier (not shown) which is capable of being moved along the length of the slide wire 4. The carrier, for example, may be in the form of an internally threaded nut adapted to ride on a screw threaded rod which is rotated in one direction or the other under control of the thermocouple 3. A suitable motor 49 is provided and is suitably coupled to the screw threaded rod to rotate the latter at the desired speed and in the desired direction and thereby to move the contact 5 along the slide wire resistance to rebalance the potentiometer on unbalance thereof.

The positive terminal of the thermocouple 3 is connected to one terminal 109 of a converting device 64 described in detail hereinbelow, and another terminal of this latter device is connected to the contact 5. As indicated in the drawing the positive terminal of the standard source 6 is connected to one end of the slidewire 4 while the negative terminal of this source is connected to the other terminal of the slide wire, the latter terminal also being connected to the negative terminal of thermocouple 3. If desired, an additional cold junction compensating means (not shown) may be connected with the thermocouple 3 for purposes well known in the thermoelectric art.

As noted hereinbefore, the device schematically indicated by the numeral 64 is capable of converting the varying minute D. C. thermoelectric potentials from the device 3 into corresponding alternating current potentials, preferably of sinusoidal wave shape. The output side of the converter 64 is coupled to the input terminals of an electron discharge amplifier T which may be of any well known form, one form of which is illustrated schematically in the drawing. Specifically, the converted alternating currents are impressed across the control grid 17 and the cathode 18 of a preamplifier tube T by the secondary winding of a coupling transformer 65 having its primary winding connected to the output terminals of the converter 64. The preamplifier tube T also includes an anode 19 and has its output circuit comprising the anode 19, a transformer primary winding 20 and a potential source 20a coupled to a translating device including two sets of grid controlled tubes 21, 22, 23, and 24. These tubes may be of any well known type, but are preferably of the gaseous or vapor filled type, so that a discharge between the anode and cathode occurs only when the grid thereof is within a predetermined potential range. As an example of a tube that may be used for this purpose the "Thyratron" may be mentioned. The transformer including the primary winding 20 is provided with two sets of secondary windings 25, 26, 27, 28. Windings 25 and 26 are connected in series across the control grids 29, 30 of tubes 21, 22, respectively. Similarly, windings 27 and 28 are connected in series across control grids 31, 32 of tubes 23 and 24, respectively. If desired, the windings 25 and 26, instead of being separate windings, may be a single winding provided with a mid-tap, and likewise the windings 27 and 28 may be in the form of a single winding with a mid-tap. The midpoint between the windings 25 and 26 is connected through a biasing source 33 to the cathodes 34 and 35 of tubes 21 and 22, respectively. Similarly, the midpoint between the windings 27 and 28 is connected through a biasing source 36 to the cathodes 37, 38. Preferably, the sources 33 and 36 are designed to bias the associated grids negatively with respect to their associated cathodes in such a manner that a discharge takes place between cathode and anode only for a predetermined instantaneous voltage on the control grids. The duration of the discharge may be controlled by varying the potential induced in the secondary windings with relation to the biasing sources 33 and 36, or by changing the phase of the current in the said secondary windings with relation to the phase of the current from the commercial supply mains 39, 40. While the drawing shows the cathodes of the tubes 21 to 24 schematically, it will be understood that any well-known form of electron-emitting cathode, whether of the thermionic or other type, may be employed. The anodes 41, 42, 43, 44 of the respective tubes 21 to 24 are connected to the alternating current mains 39 and 40 through a transformer 45, which is provided with a center-tapped secondary 46—47, the midpoint of which is connected by conductor 48 through the armature 49 of a suitable reversible motor such as a series wound motor, thence in parallel through its field windings 50, 51, to the cathodes of the tubes 21 to 24. Preferably, the field windings 50, 51 are shunted by condensers 52, 53, respectively, for the purpose of by-passing the alternating components of the current. As will be noted, the portion 46 of the secondary winding impresses a suitable potential upon the anodes 42 and 43, while the portion 47 impresses an equal potential upon the anodes 41 and 44 but reversed in phase. The motor armature 49 is connected through suitable gearing or couplings as described hereinbefore to the member 5 so that this latter member is adjusted along the slide wire 4 in accordance with the direction and duration of rotation of the armature 49. This direction and duration of rotation of the motor is controlled by the direction and extent of unbalance of the potentiometer. That is to say, if the potentiometer is unbalanced, the unbalanced E. M. F. will be translated by the converter 64 into an alternating current which is amplified by the preamplifier tube T and the grid-controlled rectifier arrangement described, and the amplified current is impressed on the terminals of the motor to selectively energize the latter for rotation in the proper direction to rebalance the potentiometer until the differential current is reduced to zero or some predetermined magnitude at which the motor fields may become deenergized.

The converter 64 referred to is illustrated, more or less diagrammatically, in Fig. 2, and a modified form of converter which may be employed is illustrated in Fig. 3. Referring to Fig. 2, the terminal 109 is connected through a light-sensitive photo-conductive cell 111 which has the property of varying its resistance in accordance with the intensity of light impinging thereon. Connected in circuit with the cell 111 is a variable resistance 112 and the primary winding of the coupling transformer 65. Positioned in front of the cell 111 is a rotatable disc 112' having a series of perforations 113 therein arranged preferably at equal radial distance from the axis of the disc. In optical alignment with the cell 111 is a steady source of light 114, the light from which is projected by a suitable optical system 115 through the perforations 113 onto the cell 111. The perforations 113 are designed and arranged so that when the disc 112' rotates, cyclical light variations are effected. The disc 112' is rotated at the required speed so as to interrupt the light at the desired frequency corresponding to the frequency of the source which supplies the grid control rectifier; that is to say, at the frequency of the current supplied by the mains 39 and 40. In this figure the rectangle 116 is intended to represent schematically a motor and motor control device similar to that of Fig. 1.

Instead of employing a steady light 114 and a light shutter or modulator 112', the light sensitive cell may be exposed to a varying light in the manner indicated in Fig. 3, wherein the source 117 may be in the form of a neon or gaseous discharge lamp having an inherent light variation characteristic, or such a lamp energized with an alternating voltage of the desired frequency. In other respects the converter of Fig. 3 is similar to that of Fig. 2 and further description thereof is believed unnecessary.

Various changes and modifications may be made herein without departing from the spirit and scope of the invention. For example, instead of employing a circumferentially perforated opaque disc, a disc having regularly recurrent opacity variations around its edge may be employed. For example, as illustrated in Fig. 4 these opacity variations may be in the form of radial striations each striation having a predetermined opacity range e. g. in the nature of "light wedge," or the striations employed in "talking movie" films. Instead of employing "variable density" striations so-called "variable area" opacities may be employed.

This application is a division of our co-pending application Serial No. 706,832, filed January 16, 1934, now Patent No. 2,218,477, issued October 15, 1940.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent is:

1. The combination of a thermocouple and a light sensitive resistance adapted to conduct current in both directions and a transformer having its primary winding connected in circuit for the flow of current from said thermocouple through said resistance and primary winding, an alternating current supply source, a regularly varying light source energized from said current supply source and transmitting light to said resistance with an intensity varying with the frequency of said current supply source.

2. The combination with a circuit including a light sensitive resistance adapted to conduct current in both directions, of means for impressing a small unidirectional electro-motive force on said circuit, and a gaseous discharge tube lamp adapted to be energized by alternating current and to continuously emit and transmit to said resistance light pulsating in intensity with a frequency corresponding to the frequency of said current.

3. In a measuring instrument, the combination of an adjustable potentiometer device, means to produce unbalanced currents in said potentiometer device, means for converting the unbalanced potentiometer current into varying current of uniform frequency, the last mentioned means including a light sensitive cell adapted to conduct current in both directions and through which the unbalanced portion of the potentiometer current is passed, a source of alternating current, and a gaseous discharge lamp energized by said alternating current circuit for producing a source of light varying in intensity at said frequency and means for illuminating the cell by said light independently of said potentiometer device, means for amplifying said converted currents, a reversible rotatable motor for adjusting said potentiometer device to reduce said unbalanced potentiometer currents, and motor control means controlled by said amplified currents.

4. In a measuring instrument, the combination of an adjustable potentiometer device, means to produce unbalanced currents in said potentiometer device, means for converting the unbalanced potentiometer current into varying current of uniform frequency, the last mentioned means including a light sensitive cell adapted to conduct current in both directions and through which the unbalanced portion of the potentiometer current is passed and a source of light varying in intensity at said frequency and means for illuminating the cell by said light independently of said potentiometer, means for amplifying said converted current, and means actuated by said amplified current for adjusting said device to reduce said unbalanced potentiometer currents.

5. In a measuring instrument, a source of direct current whose magnitude is to be measured, a light sensitive cell energized by said current and adapted to conduct current in both directions, a source of light varying in intensity at a fixed frequency, and arranged to excite said cell, means for amplifying said current after its passage through said cell, and means actuated by said amplified current for indicating the magnitude of said current.

6. In a measuring instrument, the combination of an adjustable potentiometer device, means to produce unbalanced currents in said potentiometer device, means for converting the unbalanced potentiometer current into varying current of uniform frequency, the last mentioned means including a light sensitive cell adapted to conduct current in both directions and through which the unbalanced portion of the potentiometer current is passed and a source of light varying in intensity at said frequency and means for illuminating the cell by said light independently of said potentiometer, a motor for moving said device to reduce said unbalanced potentiometer currents, and motor control means controlled by said converted current.

7. The combination with a circuit including a light sensitive resistance adapted to conduct current in both directions, of means for impressing a small uni-directional electromotive force on said circuit, means for continuously subjecting said resistance to light regularly varying in intensity but of constant average intensity whereby said force creates a pulsating current flow in said circuit, and amplifying means energized by said current flow.

8. The combination with a small uni-directional source of electromotive force, and a light sensitive resistance adapted to conduct current in both directions and a transformer having its primary winding connected in circuit with said source, of means continuously subjecting said resistance to light regularly varying in intensity but of constant average intensity.

9. The combination with a small uni-directional source of electromotive force and a light sensitive resistance adapted to conduct current in both directions and a transformer having its primary winding connected in circuit with said source, of means for continuously transmitting light regularly varying in intensity but of constant average intensity to said resistance and amplifying means connected to the secondary winding of said transformer.

10. The combination of a thermocouple and a light sensitive resistance adapted to conduct current in both directions and a transformer having its primary winding connected in a circuit for the flow of current from said thermocouple through said resistance and primary winding, a lamp energized by an electric current regularly varying in magnitude and transmitting light to said resistance with an intensity varying with the lamp energization current.

11. The combination with a circuit including a light sensitive resistance adapted to conduct current in both directions, of means for impressing a small uni-directional electromotive force on said circuit, a gaseous discharge tube lamp adapted to be energized by alternating current and to generate light pulsating in intensity with a frequency double that of the frequency of said current, means for transmitting to said resistance light generated by said lamp by corresponding halves of the successive complete alternation waves of said current, alternating current supply means energizing said lamp, and inductive control means jointly energized by currents directly supplied by said supply means and by current flow in said circuit.

12. The combination with a small unidirectional source of electromotive force, and a light sensitive resistance adapted to conduct current in both directions connected in circuit with said source, of a light source of substantial constant intensity and a rotating disc having regularly varying opacity portions near the circumference thereof disposed between said light sensitive resistance and said light source for subjecting said light sensitive resistance to light regularly varying in intensity but of substantially constant average intensity.

HUMPHREY F. PARKER.
JULIUS G. ACEVES.